(12) United States Patent
Chen (10) Patent No.: US 7,938,157 B2
(45) Date of Patent: May 10, 2011

(54) TIRE AND DETECTION-ALARM MECHANISM THEREOF

(75) Inventor: Yun-Yen Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 889 days.

(21) Appl. No.: 11/766,681

(22) Filed: Jun. 21, 2007

(65) Prior Publication Data

US 2008/0135147 A1  Jun. 12, 2008

(30) Foreign Application Priority Data

Dec. 12, 2006  (TW) ............................... 95146426 A (51) Int. Cl.
*B60C 19/00* (2006.01)
*B60C 5/00* (2006.01)

(52) U.S. Cl. .................. 152/154.2; 152/152; 152/152.1; 152/450

(58) Field of Classification Search ............... 152/152.1, 152/152, 154.2, 450; 73/146
See application file for complete search history.

(56) References Cited

U.S. PATENT DOCUMENTS

| | | | |
|---|---|---|---|
| 5,145,127 A * | 9/1992 | Barnes et al. | ............. 244/103 R |
| 5,749,984 A | 5/1998 | Frey et al. | |
| 6,910,372 B2 | 6/2005 | Wilson | |
| 7,000,462 B2 | 2/2006 | Hillenmayer et al. | |
| 2003/0214394 A1 | 11/2003 | Behrendsen | |

FOREIGN PATENT DOCUMENTS

| | | | |
|---|---|---|---|
| FR | 2841826 | * | 1/2004 |
| GB | 2124784 | * | 2/1984 |
| JP | 7174653 A | | 7/1995 |
| JP | 11-170819 | * | 6/1999 |
| JP | 2005-138683 | * | 6/2005 |

OTHER PUBLICATIONS

Abstract of KR 2001045930, Kim, S., Jun. 2001.*
Abstract of KR 2004043975, Lee, G., May 2004.*
Machine translation of FR 2841826, Jan. 2004.*

* cited by examiner

*Primary Examiner* — Justin Fischer (57) ABSTRACT

A detection-alarm mechanism is provided. The detection-alarm mechanism for a tire includes a sensor, an electronic processing unit, a post-processing unit and a display unit. The sensor includes a substrate disposed in the tire and at least one photoelectronic element fixed to the substrate. If the tire is cracked, light passes through the cracks and reaches the photoelectronic elements to generate signals. The electronic processing unit receives signals from the photoelectronic elements to generate wear information. The post-processing unit is disposed in a vehicle on which the tire is installed and receives wear information from the electronic processing unit. The display unit is disposed in the vehicle for presenting the wear information.

13 Claims, 7 Drawing Sheets

TIRE AND DETECTION-ALARM MECHANISM THEREOF

BACKGROUND OF THE INVENTION

1. Field of the Invention

The invention relates to a detection-alarm mechanism for a tire, and more particularly relates to a detection-alarm mechanism detecting cracks in tires.

2. Description of the Related Art

The tire pressure inspection, such as Tire Pressure Monitoring System (TPMS) is a well established motor vehicle safety standard. A tire wear inspection specification for parked vehicles exists. There is however, no tire wear inspection for vehicles in motion.

Piezoelectric elements, such as piezoelectric fiber, piezoelectric crystal, piezoelectric resistor, or combination of piezoelectric elements and strain gauges are employed as tire deformation sensors installed on the tires of heavy vehicles.

U.S. Pat. No. 7,000,462 discloses a tire pressure and deformation detecting mechanism comprising piezoelectric elements or combination of piezoelectric elements and strain gauges. Pressure and deformation detected by the tire pressure and deformation detecting mechanism are converted into signals transmitted by radio to a host installed in the vehicle.

U.S. Pat. No. 6,910,372 discloses a non-contact monitoring mechanism disposed in the space formed by a tire and a wheel. The non-contact monitoring mechanism comprises a processor and antenna on the middle portion thereof. At least six equal-distanced probes extend from the middle portion.

U.S. Pat. No. 5,749,984 discloses a real-time monitoring mechanism detecting the inclination of a tire with a ratio of the length of an adhesive sheet to the periphery of a tire. An area of a tire surface contacting the ground within a safe range defines reference points. A sensor is disposed in the tire to detect whether the tire is within the safe range. If the tire is within the safe range, the sensor generates a first signal, and otherwise generates a second signal. The sensor also comprises piezoelectric elements.

BRIEF SUMMARY OF INVENTION

A detection-alarm mechanism is provided. An exemplary embodiment of the detection-alarm mechanism for a tire comprises a sensor, an electronic processing unit, a post-processing unit and a display unit. The sensor comprises a substrate disposed in the tire and at least one photoelectronic element fixed to the substrate. If the tire is cracked, light passes through the cracks reaching the photoelectronic elements to generate signals. The electronic processing unit receives signals from the photoelectronic elements to generate wear information. The post-processing unit is disposed in a vehicle on which the tire is installed and receives the wear information from the electronic processing unit. The display unit presenting wear information is disposed in the vehicle on which the tire is installed.

The electronic processing unit comprises a power supply circuit providing power, a signal conversion circuit converting signals from the photoelectronic element into control signals, a wear estimation and calibration circuit comparing the control signals with a standard value to generate wear information, a memory storing the wear information, and a wireless communication circuit transmitting the wear information or receiving other signals.

A tire with the detection-alarm mechanism is provided. An exemplary embodiment of the tire comprises a main body, a wheel, a tap and a sensor. The main body comprises a plurality of ply layers and a plurality of rubber layers stacked in alternating order in alternating order to form a main surface contacting the ground and two lateral surfaces. The wheel supports the main body. The tap is disposed on the wheel for charging air into a space formed by the wheel and the main body. The sensor comprises a substrate disposed on the ply layers and at least one photoelectronic element fixed to the substrate. When the rubber layers are cracked, light passes through the cracks and reaches the photoelectronic elements to generate signals.

The sensor further comprises a detection circuit to which the photoelectronic element is connected. The sensor comprises a plurality of photoelectronic elements parallel connected and serially connected to a passive element connected to a power supply. In another embodiment, the sensor comprises a plurality of photoelectronic elements, each connected to a passive element connected to a power supply.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
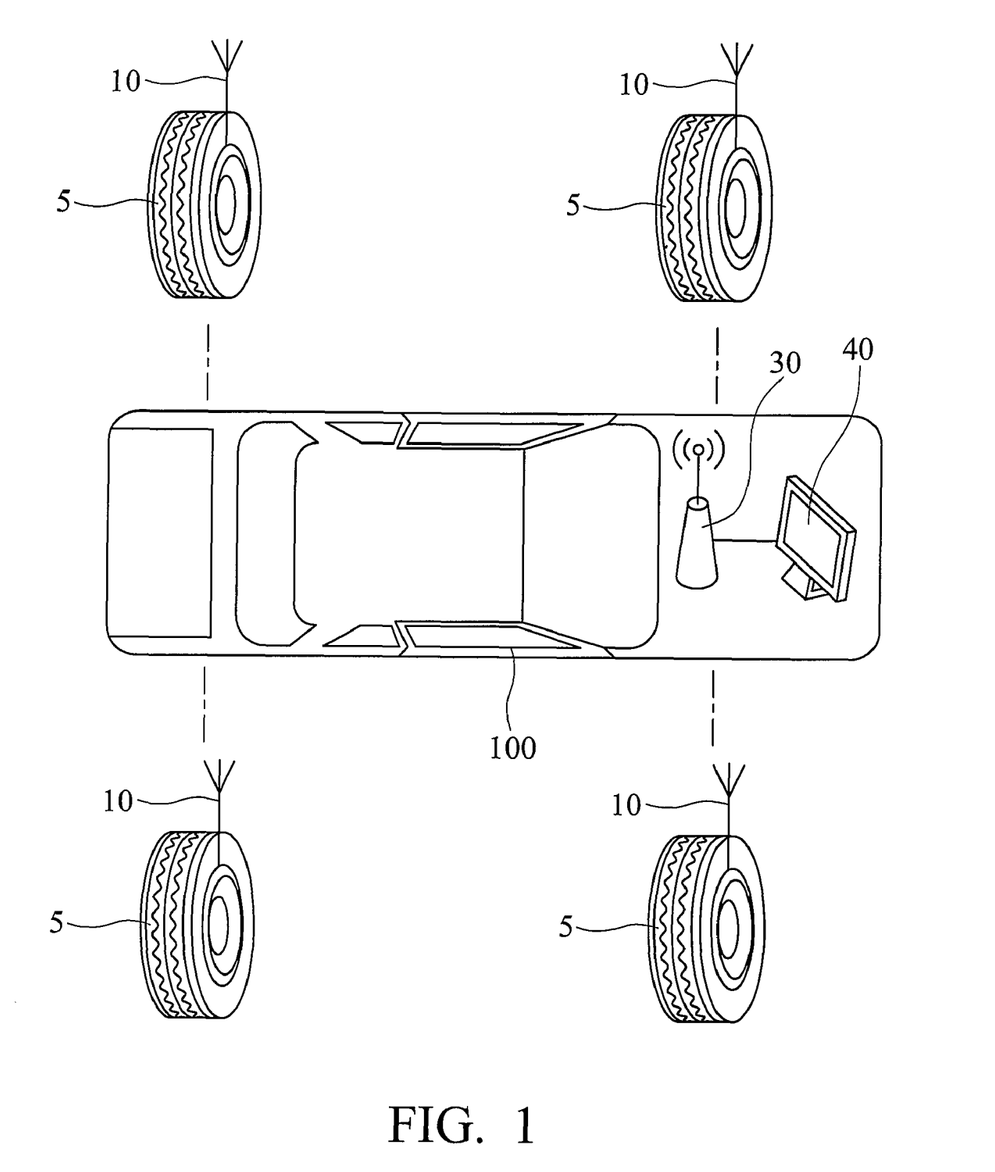
FIG. 1 is a schematic view of a detection-alarm mechanism for a tire.

A sensor 10 is embedded in a tire 5 to detect wear of the tire 5, as shown in FIG. 1. The sensor 10 comprises photoelectronic elements, such as photoconductors, photodiodes, photoresistors, phototransistors, CCD/CMOS image sensors and a substrate. The detailed structure is described in the following. Signals generated by the sensor 10 are transmitted to an electronic processing unit where the signals are converted into wear information, then transmitted the wear information to a post-processing unit 30 wirelessly and a display 40 in a vehicle 100 to notify the driver of the wear condition of the tires.

Figure 2:
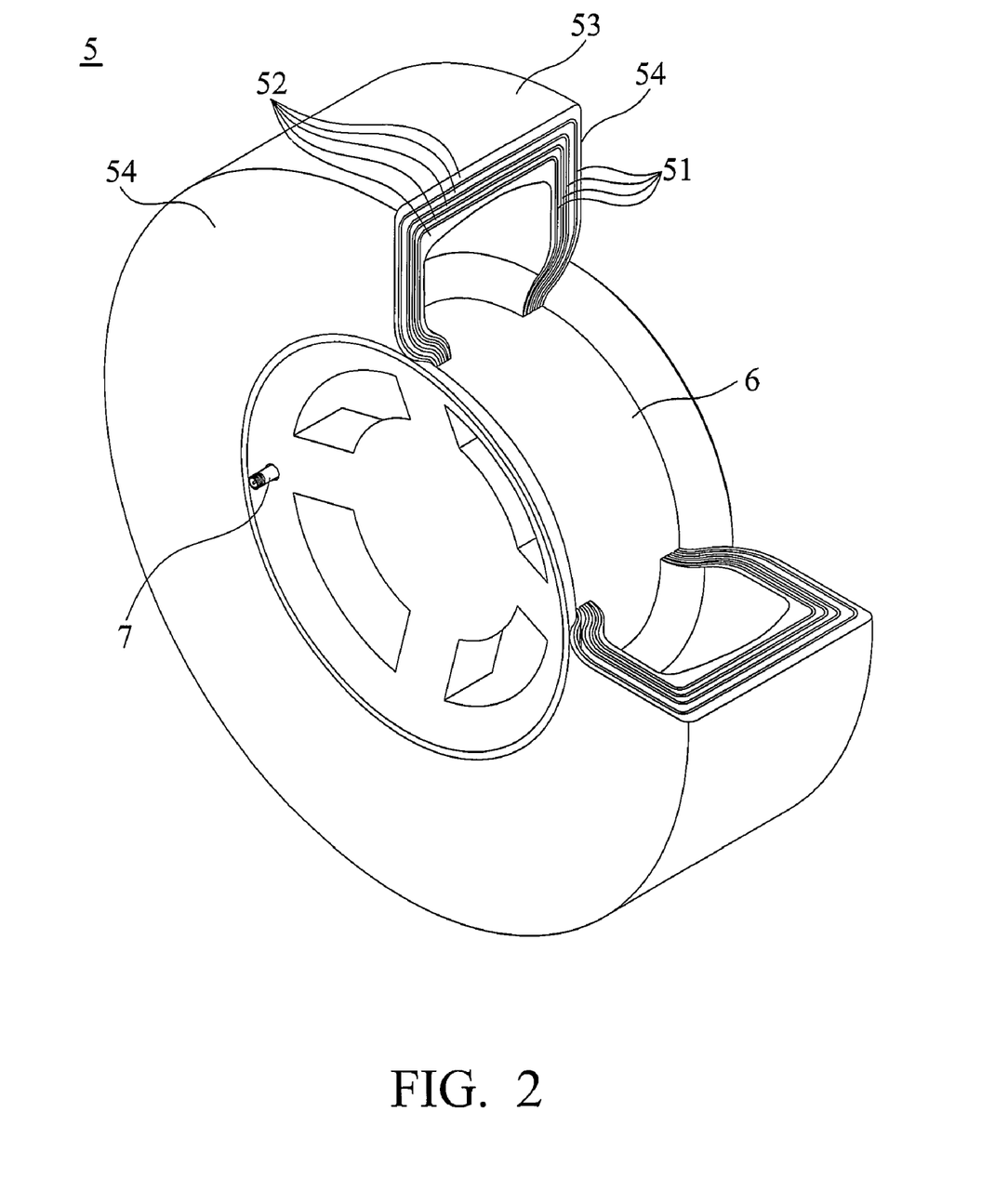
FIG. 2 is a cross section of a conventional tire.

FIG. 2 depicts the structure of the tire 5. The tire 5 comprises a plurality of rubber layers 51 and a plurality of ply layers 52 alternatively arranged to form a ringed structure which has a main surface 53 contacting the ground and two lateral surfaces 54 adjacent to the main surface 53. The rubber layers 51 corresponding to the lateral surfaces 54 have the smallest thickness. Although the lateral surfaces 54 do not contact the ground, they crack easily due to the small thickness thereof.

Figure 3:
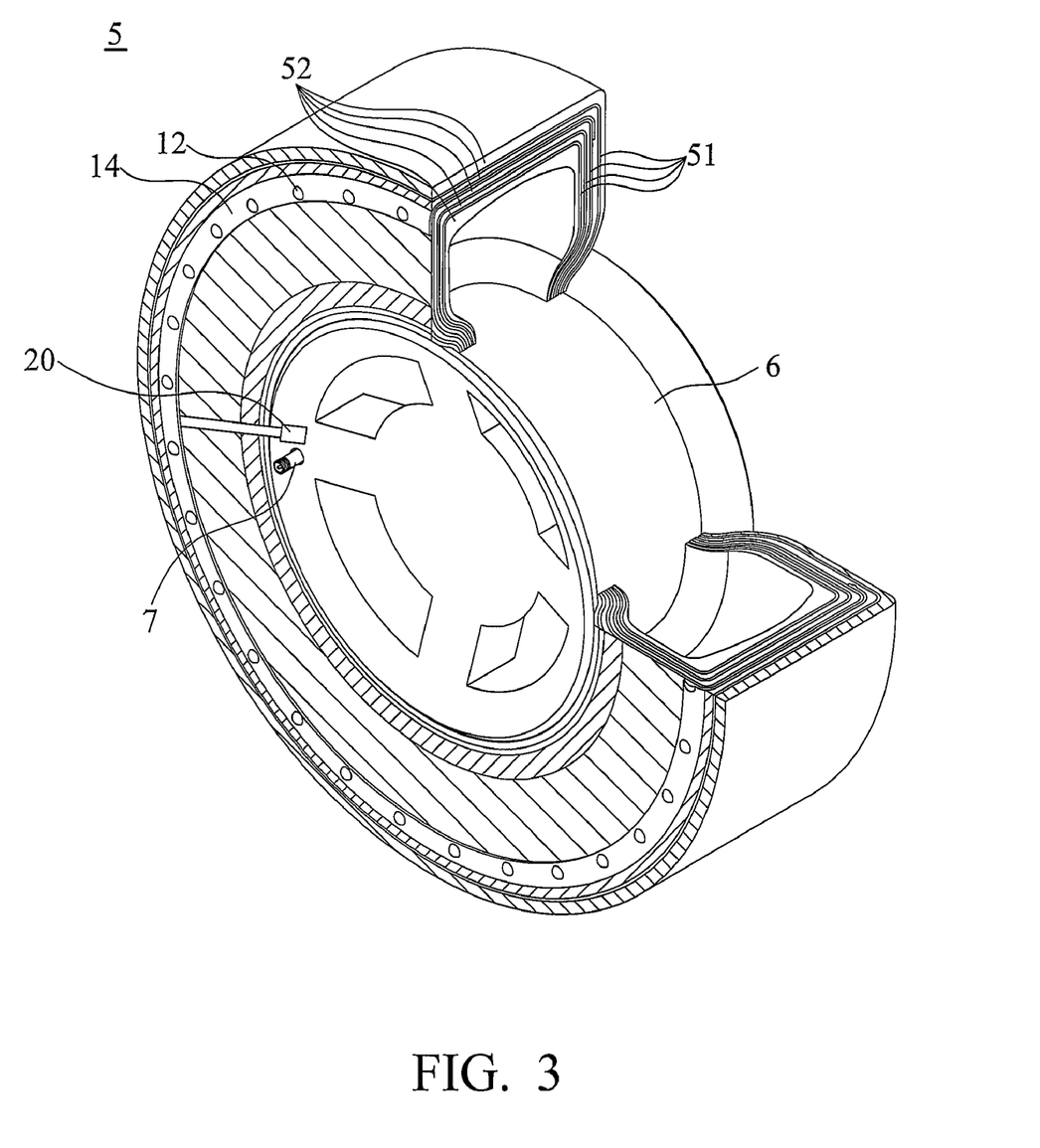
FIG. 3 is a cross section of a tire of the invention.

FIG. 3 depicts the sensor 10 embedded in the tire 5. The sensor 10 comprises a plurality of photoelectronic elements 12 and a substrate 14. The substrate 14 is striped and can be a flexible circuit board. The flexible circuit board can be comprised of a COF or tex enclosed by soft plastic or rubber. The photoelectronic elements 12 are disposed on the substrate 14 and separated by an equal distance or other specific arrangement. The substrate 14 is embedded in the predetermined ply layers 52. The third ply layer is preferred. Penetration of light to the third ply layer indicates that the ply layers above the third ply layers have cracks, thus, the driver is notified. The sensor 10 comprises a detection circuit with a connector corresponding to an electronic processing unit described later, as shown in FIG. 3. The electronic processing unit 20 may be disposed on a wheel 6 or a tap 7 of the tire 5. The structure of the electronic processing unit 20 is described in the following.

Figure 4:
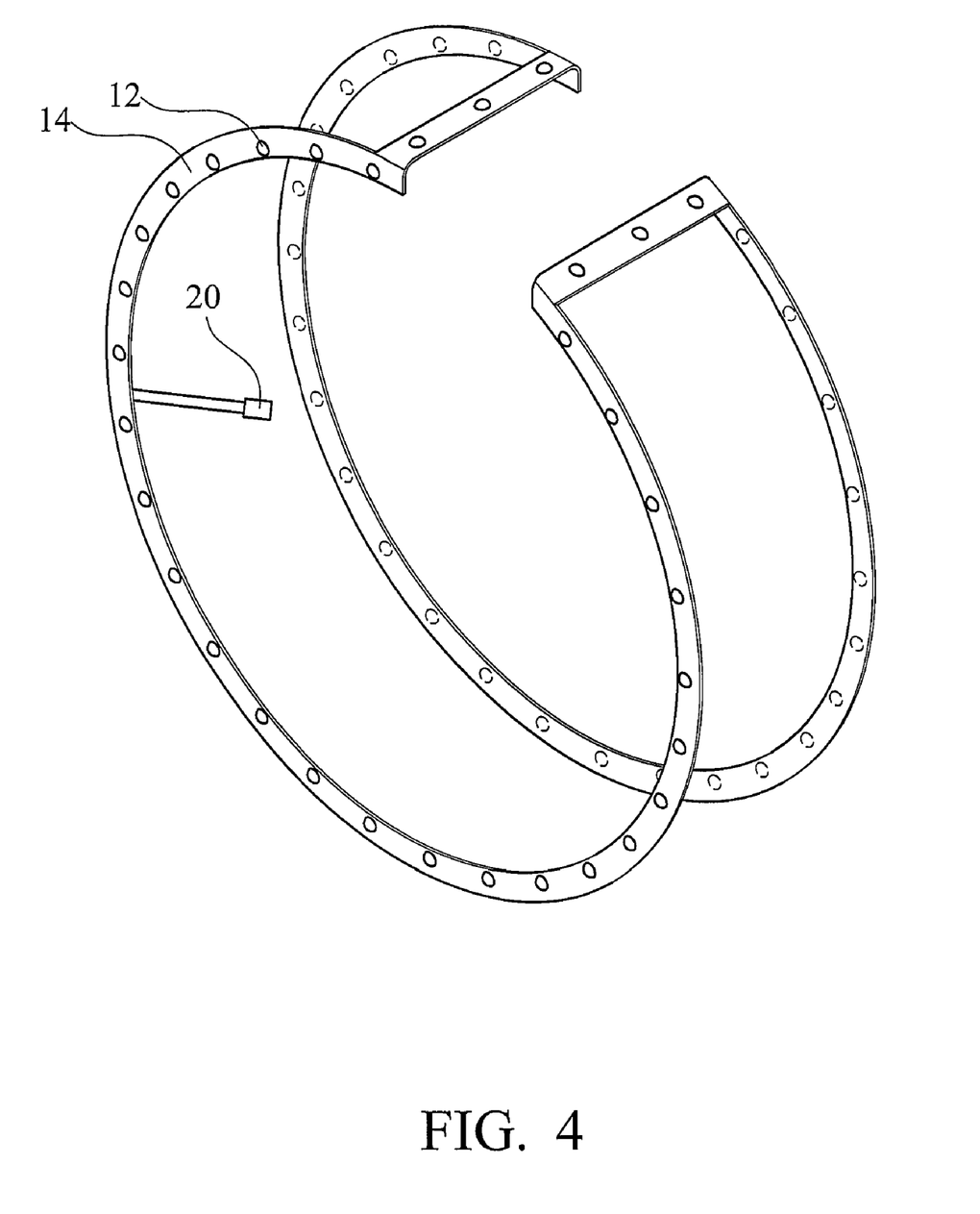
FIG. 4 is a schematic view of a sensor of the invention.

Referring to FIG. 4, the sensor 10 can be embedded as a ringed structure in the ply layers 52 encircling the tire 5 or other specific arrangement. In FIG. 4, for brevity, description of the tire 5 is omitted. The shape of the sensor 10 is the same as the structure embedded in the tire 5. The sensor 10 comprises a plurality of photoelectronic elements 12. Because the likelihood of cracks tire 5 in the lateral surfaces 54 of the tire 5 is greater than the main surface 53, due to aging, overloading or other wear, the sensor 10 comprises at least two photoelectronic elements 12 embedded in two lateral surfaces 54 respectively.

Figure 5:
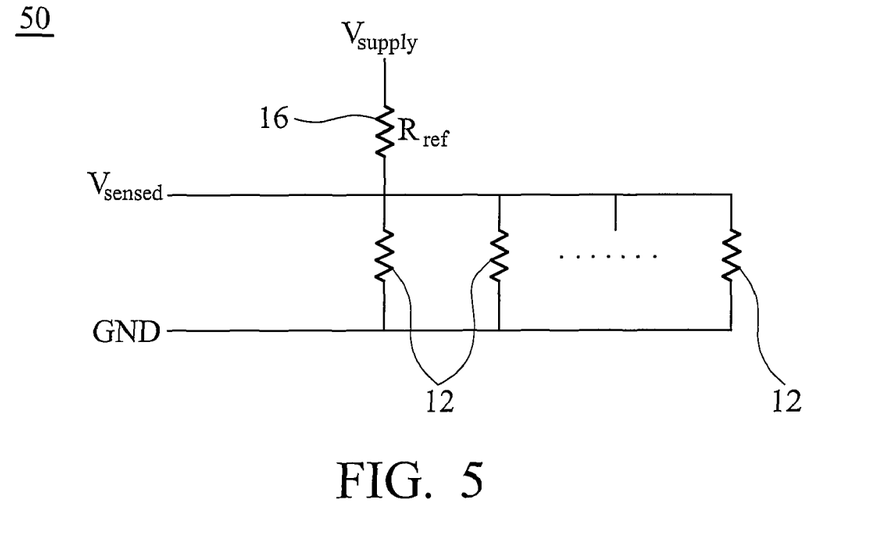
FIG. 5 is a circuit diagram of an embodiment of a detection circuit of the invention.

The sensor 10 comprises a detection circuit 50, as shown in FIG. 5. The photoelectronic elements 12 are parallel connected to the detection circuit 50 and connected to a power supply $V_{supply}$ via a resistance 16 (passive element) and a detecting end $V_{sensed}$. The detecting end $V_{sensed}$ detects voltage signals or current signals. When the sensor 10 is embedded in the tire 5, a standard value (reference value) of voltage or current in the tire 5 is set. The standard value represents the condition of a new tire. The standard value is saved in the electronic processing unit 20 to be a reference value for determining the wear condition of the tire 5. When the tire 5 is cracked by age, wear, the electronic property of the photoelectronic elements, such as resistance value, is changed by light intensity. The voltage or current of the detecting end $V_{sensed}$ is also changed, whereby the wear condition of the tire 5 is detected.

Figure 6:
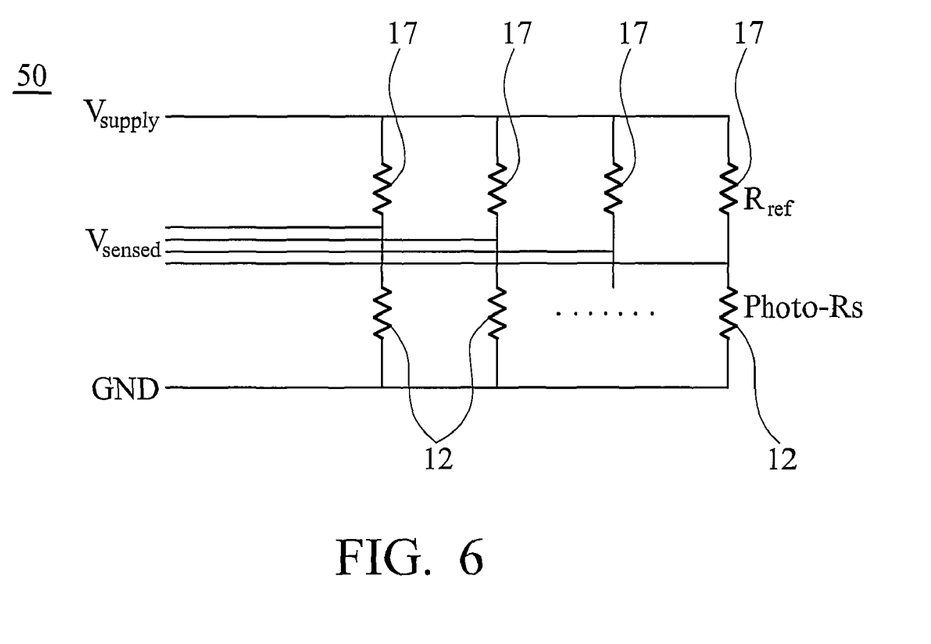
FIG. 6 is a circuit diagram of another embodiment of a detection circuit of the invention.

FIG. 6 depicts another embodiment of the detection circuit 50. Each photoelectronic element 12 is connected to the power supply $V_{supply}$ via a resistance 17 respectively. Each photoelectronic element 12 has a detecting end $V_{sensed}$ and capable of detecting the wear conditions at different positions on the tire 5.

Figure 7:
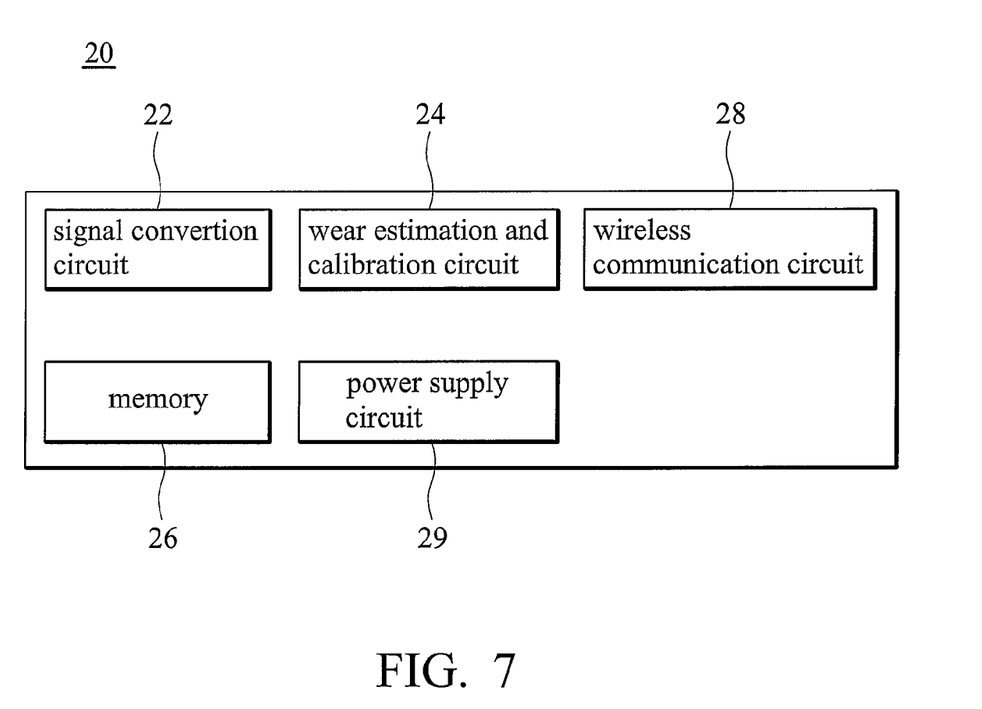
FIG. 7 is a block diagram of an electronic processing unit of the invention.

The structure of the electronic processing unit 20 is described in the following. Referring to FIG. 3, the electronic processing unit 20 can be disposed in the wheel 6 or the tap 7. In FIG. 7, the electronic processing unit 20 comprises a signal conversion circuit 22, a wear estimation and calibration circuit 24 (digital logic circuit or firmware executed by microprocessor), a memory 26 (EEPROM or flash memory, external or built in the microprocessor implementation), a wireless communication circuit 28 and a power supply circuit 29.

The signal conversion circuit 22 converts the voltage, current or digital signals received by the detecting end $V_{sensed}$ into digital control signals. The signal conversion circuit 22 comprises an amplifier, a filter, a conversion circuit, an A/D or D/A converter, a pixel converting circuit or specific combination from above electronic element.

The wear estimation and calibration circuit 24 receives control signals and executes a specific algorithm to obtain data (wear information) indicating the wear condition about the tire 5. The wear information is transmitted to the post-processing unit and displayed in the vehicle as an alarm. The wear information can be saved in the memory 26. The wear information can be a reference value for the algorithm, which is saved in the memory 26.

The electronic processing unit 20 and the post-processing unit and the display unit utilize the wireless communication circuit 28. The wireless communication circuit 28 can also be utilized to give calibration commands.

The power supply circuit 29 provides power for the electronic processing unit 20.

If more than one signal is input to the electronic processing unit 20 by the sensor 10, a multiplexer is employed. The multiplexer may be an analog type connected to an output end of the sensor 10, or a digital type connected to an input end of the electronic processing unit 20. The wear estimation and calibration circuit 24 controls the multiplexer.

Figure 8:
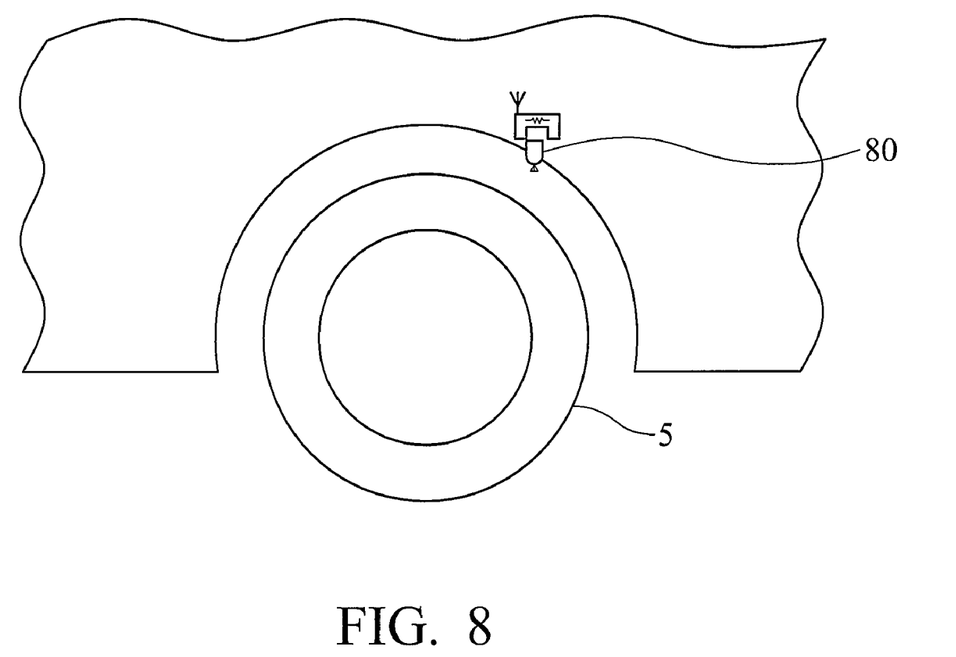
FIG. 8 is a detection device for detecting tire wear.

The power supply circuit 29 can be charged by radio wave in a short distance. A power supply is disposed in the vehicle the electronic processing unit 20 is charged by electromagnetic induction, such as the RFID Reader method. The battery is not required to be disposed in the tire. A CCD or CMOS pixel detection unit 80 for detecting the thread pattern of a tire, as shown in FIG. 8.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tire, comprising
   a main body comprising a plurality of ply layers and a plurality of rubber layers stacked in alternating order to form a main surface contacting the ground, a first lateral side, and a second lateral side;
   a wheel supporting the main body;
   a tap disposed on the wheel for charging air into a space formed by the wheel and the main body; and
   a sensor comprising:
      a substrate disposed on an interior one of the ply layers and arranged to extend around the wheel on the first lateral side; and
      a plurality of photoelectronic elements fixed to the substrate and separately arranged on the first lateral side, arranged such that when the ply and rubber layers above the substrate are worn, light passes through the worn ply and rubber layers and reaches the photoelectronic elements to generate signals.

2. The tire as claimed in claim 1, wherein the sensor further comprises a detection circuit to which the photoelectronic elements are connected.

3. The tire as claimed in claim 2, wherein the photoelectronic elements are parallel connected and serial connected to a passive element connected to a power supply.

4. The tire as claimed in claim 2, wherein each photoelectronic element is connected to a passive element connected to a power supply.

5. The tire as claimed in claim 4, wherein the detection circuit further comprises a multiplexer receiving signals from the photoelectronic elements.

6. The tire as claimed in claim 2, wherein the photoelectronic element is a photoresistor, a photoelectronic conductor, a photo diode, a phototransistor, a photocoupler, or a CMOS element.

7. The tire as claimed in claim 1 further comprising an electronic processing unit comprising:
   a power supply circuit providing power;
   a signal conversion circuit converting signals from the photoelectronic elements into control signals;

a wear estimation and calibration circuit comparing the control signals with a standard value to generate wear information;

a memory storing the wear information;

a wireless communication circuit transmitting the wear information or receiving other signals.

8. The tire as claimed in claim 7, wherein the electronic processor unit is disposed on the wheel.

9. The tire as claimed in claim 7, wherein the electronic processing unit is disposed on the tap.

10. The tire as claimed in claim 1, further comprising an electronic processing unit for processing the signals, and the electronic processing unit comprises a power supply circuit providing power charged by electromagnetic wave.

11. The tire as claimed in claim 1, further comprising a detection unit for detecting the thread pattern of the main surface of the main body.

12. The tire as claimed in claim 1, wherein the substrate extends below the main surface, and additional photoelectronic elements are fixed to the substrate and separately arranged below the main surface.

13. The tire as claimed in claim 1, wherein the substrate extends around the wheel on the second lateral surface, and additional photoelectronic elements are fixed to the substrate and separately arranged on the second lateral side.

* * * * *